(12) United States Patent
Kobayashi

(10) Patent No.: US 6,388,414 B1
(45) Date of Patent: May 14, 2002

(54) STEP MOTOR DRIVING APPARATUS

(75) Inventor: Kouichi Kobayashi, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 09/680,326

(22) Filed: Oct. 6, 2000

(30) Foreign Application Priority Data

Oct. 7, 1999 (JP) .......................................... 11-286177

(51) Int. Cl.$^7$ ................................................ H02P 8/06
(52) U.S. Cl. ........................ 318/685; 318/266; 318/468
(58) Field of Search ................................ 318/264, 265, 318/266, 286, 466, 467, 468, 685, 696

(56) References Cited

U.S. PATENT DOCUMENTS

| 4,857,947 A | * | 8/1989 | Wakabayashi et al. ... 354/195.1 |
| 5,204,715 A | * | 4/1993 | Nakanishi et al. .......... 354/475 |
| 5,302,991 A | * | 4/1994 | Nakayama ............. 354/195.12 |
| 5,918,080 A | * | 6/1999 | Yoshida ...................... 396/207 |

FOREIGN PATENT DOCUMENTS

| JP | 8-15592 | 1/1996 |
| JP | 8-106038 | 4/1996 |

* cited by examiner

*Primary Examiner*—Bentsu Ro
(74) *Attorney, Agent, or Firm*—Nixon Peabody LLP; Thomas W. Cole

(57) ABSTRACT

In a drive apparatus, an operating member is driven by a step motor under control of a control section in response to a signal from a detection section. The control section sets the operating member to an initial position from a mechanically stopped position by forward rotating the step motor at a predetermined step number. At a time of starting an operation of the operating member from the initial position, the control section temporarily reverse rotates the step motor to move the operating member to a detection zone so that the detecting section may detect the signal when the operating member performs a normal movement. Then, the control section responds to the signal to forward rotate the step motor so as to move the operating member to a target position. At a time of a returning operation to the initial position from the target position, the control section reverse rotates the step motor so as to return the operating member from the target position to the detection zone so that the detecting section may detect the signal when the operating member performs a normal movement. Then, the control section responds to the signal to forward rotate the step motor to move the operating member to the initial position, thereby finishing a series of the operations.

3 Claims, 20 Drawing Sheets

FIG. 16

| | $t_A$ | $t_B$ |
|---|---|---|
| FIRST PULSE | 2.3 | 1.6 |
| SECOND PULSE | 2.3 | 1.6 |
| THIRD PULSE | 2.3 | 1.7 |
| FOURTH PULSE | 2.3 | 1.7 |
| FIFTH PULSE | 2.1 | 1.8 |
| SIXTH PULSE | 2.1 | 1.8 |
| SEVENTH PULSE | 1.9 | 1.9 |
| EIGHTH PULSE | 1.9 | 1.9 |
| NINTH PULSE | 1.7 | 2.0 |
| TENTH PULSE | 1.7 | 2.0 |
| ELEVENTH PULSE | 1.6 | 2.1 |
| TWELFTH PULSE | 1.6 | 2.1 |
| THIRTEENTH PULSE | 1.5 | 2.3 |
| FOURTEENTH PULSE | 1.5 | |

FIG. 18

| | $t_C$ | $t_D$ |
|---|---|---|
| FIRST PULSE | 2.3 | 1.3 |
| SECOND PULSE | 2.3 | 1.3 |
| THIRD PULSE | 2.3 | 1.4 |
| FOURTH PULSE | 2.3 | 1.4 |
| FIFTH PULSE | 2.1 | 1.5 |
| SIXTH PULSE | 2.1 | 1.5 |
| SEVENTH PULSE | 1.8 | 1.7 |
| EIGHTH PULSE | 1.8 | 1.7 |
| NINTH PULSE | 1.5 | 1.9 |
| TENTH PULSE | 1.5 | 1.9 |
| ELEVENTH PULSE | 1.3 | 2.1 |
| TWELFTH PULSE | 1.3 | 2.1 |
| THIRTEENTH PULSE | 1.2 | 2.3 |
| FOURTEENTH PULSE | 1.2 | |

STEP MOTOR DRIVING APPARATUS

BACKGROUND OF THE INVENTION

Field of the Invention

The present invention relates to a step motor driving apparatus employed in a still camera or the like. More particularly, the present invention relates to technique of detecting and securing an initial position or home position of the step motor.

2. Description of the Prior Art

Conventionally, there has been widely used a step motor driving apparatus employing a step motor as a drive source. For example, the step motor driving apparatus is used for feeding a lens system assembled in a still camera or the like. In general, the step motor driving apparatus has an operating member connected to the step motor so as to operate the lens or the like, a link member for connecting the operating member to the step motor, a detecting section for detecting an initial position of the operating member, and a control section composed of a microprocessor for performing an operation control of the operating member in response to a rotation of the step motor. When feeding out the lens, at first, the control section forward rotates the step motor so as to start the operating member. Accordingly, the operating member is moved to a target position from a mechanically stopped extreme position through the initial position or home position which provides a basis or reference for operation. During the course of forward rotating the step motor, it is judged by the detecting section whether or not the operating member performs a predetermined normal movement at a time of passing through the initial position, and whether or not the operating member is moved to the target position after the judgement.

In the conventional step motor driving apparatus mentioned above, the structure is designed such that the operating member passes through the initial position in the middle of the forward rotation of the step motor, and this operation is detected by the detecting section. On the contrary, in a returning operation, the structure is designed such that the operating member passes through the initial position during the course of reverse rotating the step motor, and this returning operation is detected. Therefore, the direction of operation for detecting the initial position is different between the starting time and the returning time of the operating member. Thus, there is generated a backlash, a play or the like in the case that the link member for connecting the step motor to the operating member is constituted by a gear train or the like. Consequently, there is a problem that a lag is generated at a timing for detecting the initial position between the forward rotating time and the reverse rotating time. When the timing lag mentioned above is generated, there is a risk that a system constituted by the step motor as the drive source, the operating member for driving the lens or the like and the control section or the microprocessor is erroneously operated to create a system error.

SUMMARY OF THE INVENTION

In order to solve the problems in the prior art mentioned above, the following means is considered. Namely, an inventive apparatus comprises a step motor capable of forward rotating and reverse rotating as a drive source, an operating member connected to the step motor for operation from an initial position to a target position, a link member for connecting the operating member to the step motor, a detecting section for detecting a signal when the operating member comes into a detection zone, and a control section for controlling the operation of the operating member by rotating the step motor. In the apparatus, the control section sets the operating member to the initial position from a mechanically stopped position by forward rotating the step motor at a predetermined step number. At a time of starting the operation of the operating member from the initial position, the control section temporarily reverse rotates the step motor to move the operating member to the detection zone so that the detecting section may detect the signal when the operating member performs a normal movement. Then, the control section responds to the signal to forward rotate the step motor so as to move the operating member to the target position. At a time of a returning operation to the initial position from the target position, the control section reverse rotates the step motor so as to return the operating member from the target position to the detection zone so that the detecting section may detect the signal when the operating member performs a normal movement. Then, the control section responds to the signal to forward rotate the step motor to move the operating member to the initial position, thereby finishing a series of the operations.

Preferably, the control section controls the rotation of the step motor so as to forcibly move the operating member to the initial position when the detecting section fails to detect the signal since the operating member does not perform the normal movement. Further, the control section generates an alarm indicating that an erroneous operation occurs when the control section fails to forcibly return the operating member to the initial position.

In accordance with the present invention, the initial position of the operating member is set to a home position obtained by moving the operating member from the mechanically restricted extreme position to a direction of forward rotation of the step motor at a degree corresponding to some steps. Then, for the initial position detection at a time of starting the operating member, the step motor is temporarily reverse rotated so as to detect the signal during the process. Further, in returning to the initial position after the operation is completed, the step motor is reverse rotated and the initial position of the operating member is detected during the process. Accordingly, as well as an initial position detection at a time of starting and another initial position detection at a time of returning after the operation is completed, the initial position detection is executed by the operation in the reverse rotational direction of the step motor for mechanical resetting purpose, so that it is possible to restrict a timing lag for detecting the signal caused by a backlash or a play of the link member employing the gear train or the like.

BRIEF DESCRIPTION OF THE DRAWINGS

FIG. 16 is a table diagram for explaining an operation of the step motor driving apparatus in accordance with the present invention;

FIG. 18 is a table view for explaining an operation of the step motor driving apparatus in accordance with the present invention;

DESCRIPTION OF THE PREFERRED EMBODIMENT

Figure 1:
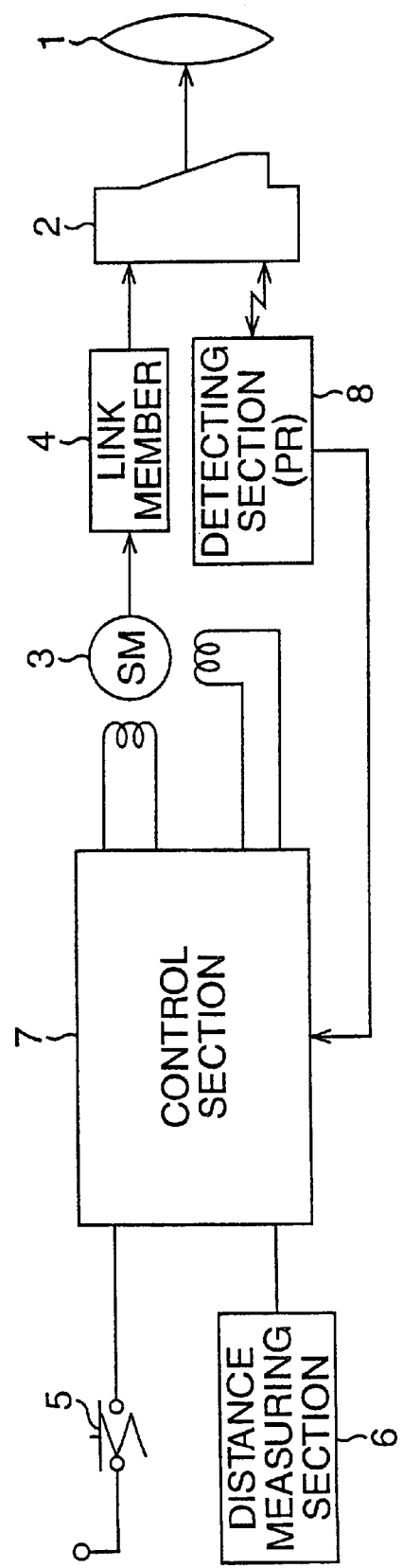
FIG. 1 is a block diagram showing a basic structure of a step motor driving apparatus in accordance with the present invention.

A description will be in detail given below of an embodiment in accordance with the present invention with reference to the accompanying drawings. FIG. 1 is a block diagram showing a basic structure of a step motor driving apparatus in accordance with the present invention. Reference numeral 1 denotes a photographing lens for forming an object image on a predetermined image surface, reference numeral 2 denotes an operating member including a cam or the like for driving the photographing lens, reference numeral 3 denotes a step motor (SM) serving as a drive source, and reference numeral 4 denotes a link member for transmitting a rotation of the step motor 3 to the operating member 2. A gear train obtained by combining a plurality of gears is generally employed for the link member 4. Reference numeral 5 denotes a switch for executing a distance measuring operation and a focusing operation in interlocking with an operation of a shutter button or the like, and reference numeral 6 denotes a distance measuring section for measuring an object distance in accordance with an active distance measuring method or other known methods. Further, reference numeral 7 denotes a control section constituted by a microprocessor, which controls drive pulses A and B for supplying to the step motor 3. Reference numeral 8 denotes a detecting section for directly or indirectly detecting a position of the operating member 2. The detecting section 8 is constituted by a photo reflector (PR).

In the structure mentioned above, the control section 7 sets an initial position of the operating member 2 to a home position by forward rotating the step motor 3 at a predetermined step number (for example, eight steps) from a mechanically restricted extreme position. The control section 7 temporarily reverse rotates the step motor 3 at a time of starting the operating member 2 from the initial position to a detection zone, so that the detecting section 8 can detect a signal in the signal detection zone of the detecting section 8. Thus, the control section 7 confirms that the operating member 2 performs a predetermined normal movement, and Then forward rotates the step motor 3 so as to move the operating member 2 to a target position to set the lens 1. The target position is previously determined in correspondence to an output result of the distance measuring section 6. On the contrary, the control section 7 reverse operates the step motor 3 so as to temporarily return the operating member 2 to the signal detection zone of the detecting section 8 so that the detection section 8 performs the signal detection at a time of returning the operating member 2 from the target position to the initial position. The control section 7 forward rotates the step motor 3 so as to move the operating member 2 to the initial position after confirming that the predetermined normal movement is performed, whereby a series of operation is finished. In preferable, the control section 7 controls the rotation of the step motor 3 so as to forcibly move the operating member 2 to the initial position when judging that the operating member 2 does not perform the predetermined normal movement. Further, the control section 7 is structured such as to generate an alarm indicating an erroneous operation at a time of failing to forcibly return the operating member 2 to the initial position.

Figure 2:
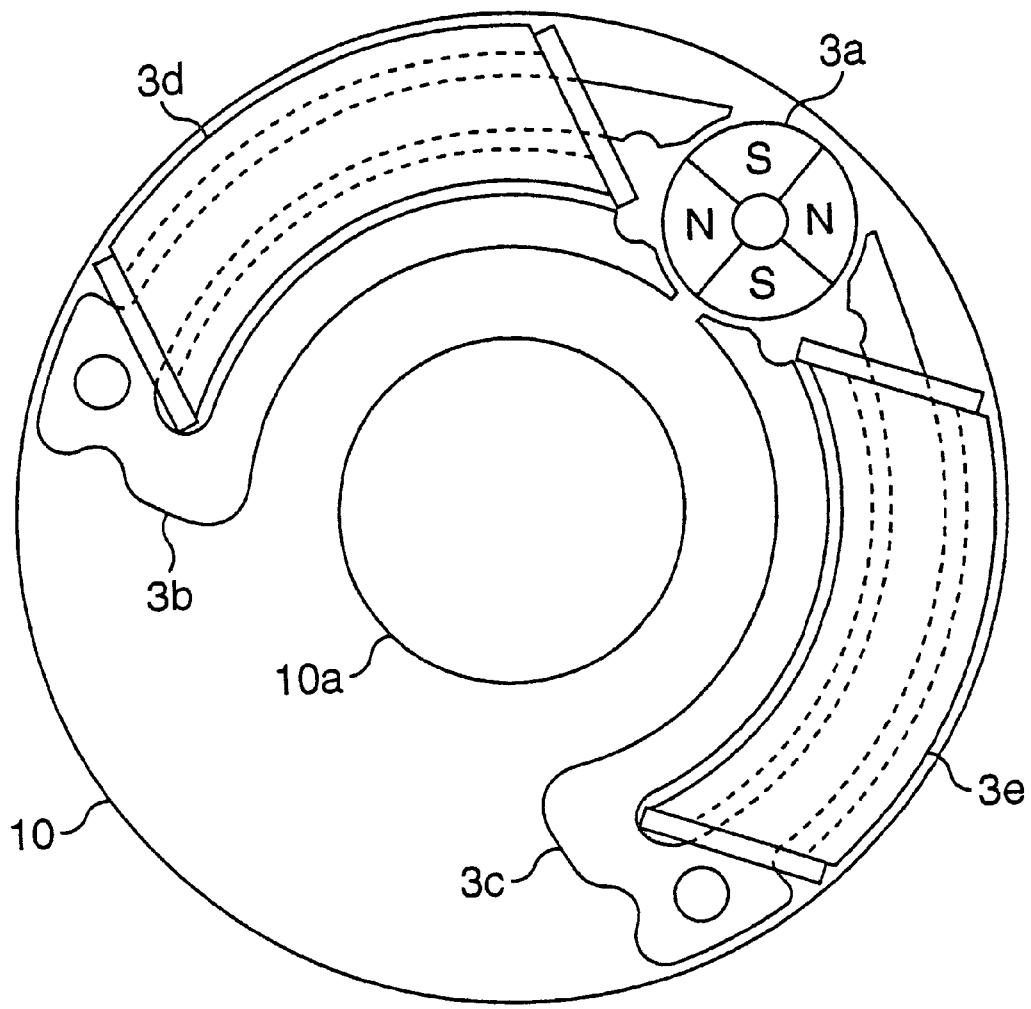
FIG. 2 is a plan view showing a structural embodiment of a step motor.

FIG. 2 shows a concrete structural embodiment of the step motor 3. Reference numeral 10 denotes a base plate in which an exposure opening 10a is formed at a center thereof. Reference numeral 3a denotes a rotor in which positive poles (S) and negative poles (N) are alternately arranged at an interval of 90 degrees, reference numerals 3b and 3c denote a stator. The stators 3b and 3c are arranged in such a manner as to be laterally symmetrical so as to face magnetic poles to the rotor 3a. Each of the stators is basically formed in a horseshoe shape, and formed in a substantially concentric circular arc shape around the exposure opening 10a in order to improve compactness. Front ends of the magnetic poles are arranged around a rotational axis at an interval of 45 degrees–90 degrees–135 degrees–90 degrees. Coils 3d and 3e are respectively wound around the stators 3b and 3c, and by applying pulse signals A and B having shifted phases to the respective coils 3d and 3e, the rotor 3a rotates in a direction corresponding to a phase of the pulse signal in a stepwise manner.

Figure 3:
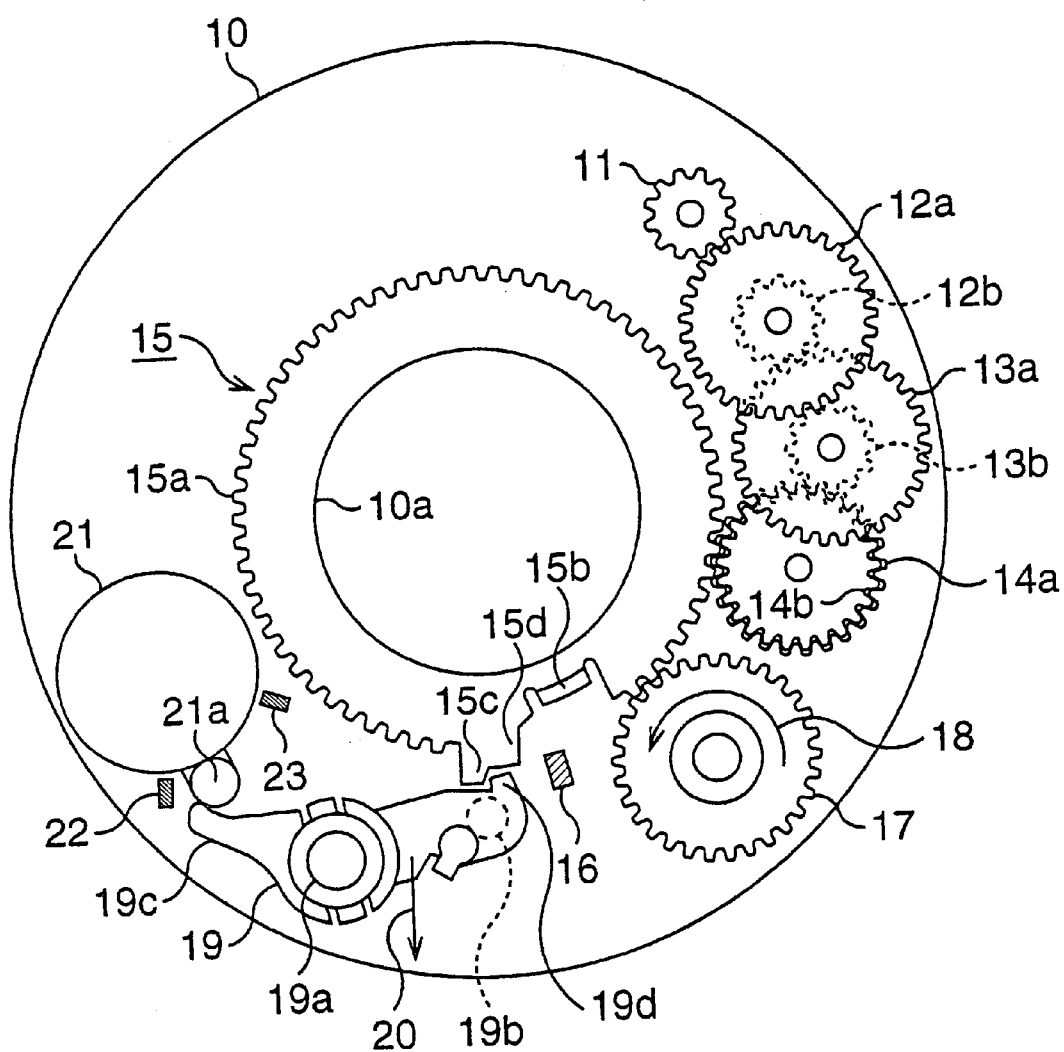
FIG. 3 is a plan view showing an initial position of an operating member assembled in the step motor driving apparatus in accordance with the present invention.
Figure 4:
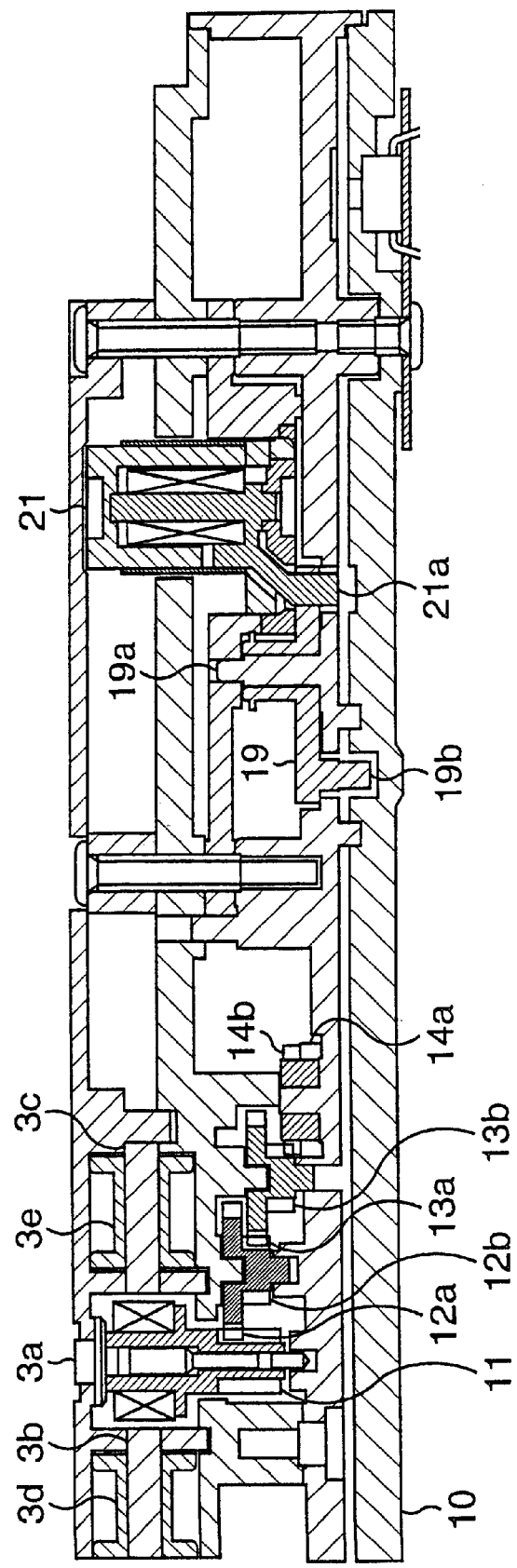
FIG. 4 is a cross sectional view showing a structure of the step motor driving apparatus in accordance with the present invention.

The rotation of the rotor 3a is transmitted via a gear train or transmitting means shown in FIGS. 3 and 4. In this case, FIG. 3 is a plan view as seen from an object side, and FIG. 4 is a cross sectional view. At first, reference numeral 11 denotes an output pinion coaxial with the rotor 3a. Further, reference numerals 12a and 12b, 13a and 13b, and 14a and 14b respectively denote large-diameter wheels and small-diameter wheels, which respectively constitute two-stage gears. A rotation of the output pinion 11 is transmitted to the large-diameter wheel 12a so as to coaxially rotate the small-diameter wheel 12b. A rotation of the small-diameter wheel 12b is transmitted to the large-diameter wheel 13a so as to rotate the small-diameter wheel 13b. A rotation of the small-diameter wheel 13b is transmitted to the small-diameter wheel 14b so as to rotate the large-diameter wheel 14a. Further, reference numeral 15 denotes a lens drive ring or lens drive means in which a rack 15a is formed substantially all around the periphery. The lens drive ring 15 is rotatably supported around the exposure opening 10a, and the rack 15a is engaged with the large-diameter wheel 14a. A lens frame mentioned below is connected to a convex piece 15b formed in the lens drive ring 15, and the lens frame is fed out toward a close photographing position from a infinity position when the lens drive ring 15 is rightward rotated around the exposure opening 10a from the state shown in FIG. 3. Further, reference numeral 16 denotes a stopper for restricting an extreme position of the lens drive ring 15. In this case, in an illustrated state, the lens drive ring 15 constituting the operating member is placed in a stop state at a position by forward rotating at a degree of eight steps from the stopper 16. This is an initial position of the lens drive ring 15. Further, the lens drive ring 15 has a contact portion 15d with respect to the stopper 16. Further, a feed-out gear 17 is engaged with the rack 15a and is applied with a bias force in a leftward rotating way by a spring 18. In this case, as shown by the drawing, in the spring 18, only an urging direction is shown by an arrow, however, a particular structure of the spring is not limited as far as the urging bias force in this direction can be applied. Accordingly, the lens feed-out gear 17 applies an urging force in a rightward rotating direction to the lens drive ring 15, and reduces a load torque applied to the step motor 3 at a time of feeding out the lens. In this case, the urging force applied by the spring 18 has a limit of less than rotating the step motor in a nonconductive off state. In this case, the gears 12 to 14 are connected between the pinion 11 corresponding to an output from the step motor and the lens drive ring 15, and a backlash exists between the respective gears. In this case, the spring 18 applies an urging force in one direction in order to prevent the backlash at a certain degree. However, when the greater load than the urging force of the spring 18 is generated, the backlash causes an influence in the operation. The spring 18 can cancel the backlash at a time of stopping the lens, however, the spring 18 is not designed to cancel the backlash at a time of detecting a positional signal.

Next, reference numeral 19 denotes a blade opening and closing lever for opening and closing a shutter blade mentioned below. The blade opening and closing lever 19 is rotatably supported by a shaft 19a, and is applied with an urging force in rightward rotating way by a spring 20. In this case, in the spring 20, only an urging direction is shown by an arrow. A pin 19b on a back surface of a front end portion of the blade opening and closing lever 19 is engaged with the shutter blade mentioned below, and when the blade opening and closing lever 19 is rightward rotated from an illustrated state, the shutter blade mentioned below opens the exposure opening 10a. Reference numeral 21 denotes a blade driving motor for driving the blade opening and closing lever, and a drive pin 21a swings or pivots within a predetermined angle range by energizing the motor 21. An arm 19c disposed at a front end of the blade opening and closing lever 19 is engaged with the output pin 21a, and when the output pin 21a is leftward rotated, the blade opening and closing lever 19 is rightward rotated due to the urging force of the spring 20. In this case, reference numerals 22 and 23 denote stoppers for restricting the swinging range of the output pin 21a. In this case, a projection 19d is formed in a rear end of the blade opening and closing lever 19. A convex portion 15c is formed in the lens drive ring 15 so as to engage with the projection 19d.

Figure 5:
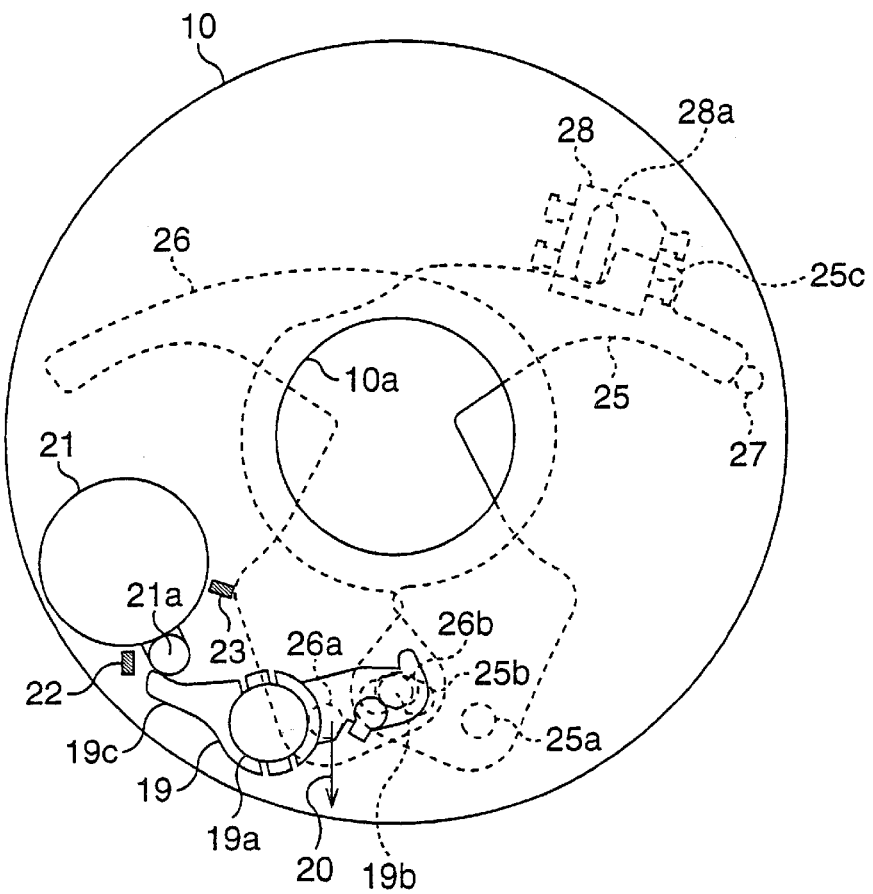
FIG. 5 is a plan view of a shutter blade opening and closing mechanism with relation to the step motor driving apparatus in accordance with the present invention.

Next, a structure around the shutter blade will be described as shown in FIG. 5. Reference numerals 25 and 26 respectively denote shutter blades basically having a symmetrical shape in a lateral direction. The shutter blades 25 and 26 are respectively supported to shafts 25a and 26a provided on the back surface of the base plate 10 so as to freely pivot, and structured such that a pin 19b standing on the back surface of the front end of the blade opening and closing lever 19 is engaged with elongated holes 25b and 26b formed in the shutter blades 25 and 26 through the base plate 10. In this view, a through-hole in the base plate 10 is omitted so as to avoid complexity of the drawings. Accordingly, when rightward rotating the blade opening and closing lever 19 from the illustrated state, the shutter blade 25 leftward rotates around the shaft 25a, and the other shutter blade 26 leftward rotates around the shaft 26a so as to open the exposure opening 10a. In this case, reference numeral 27 denotes a stopper for restricting an initial position of the shutter blade 25, and reference numeral 28 denotes a photo reflector (PR) for detecting a blade position.

In this case, the photo reflector 28 is commonly used for detecting the initial position of the lens drive ring 15. That is, the lens drive ring 15 interlocks with the shutter blade 25 via the blade opening and closing lever 19, and is structured such that a backing piece 25c formed in the shutter blade 25 passes through a sensor hole 28a of the photo reflector 28 in accordance with a motion of the lens drive ring 15.

Figure 6:
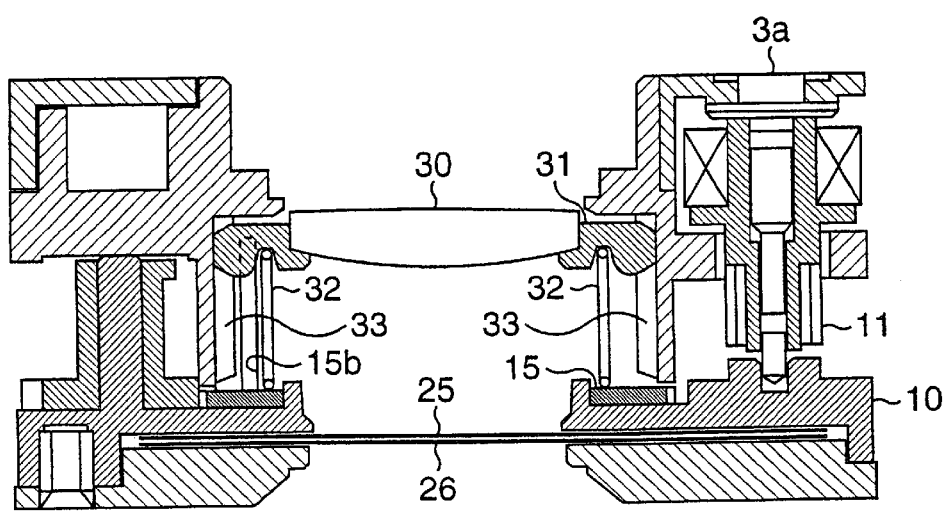
FIG. 6 is a cross sectional view of a lens drive mechanism operated by the step motor driving apparatus in accordance with the present invention.

Next, FIG. 6 is a cross sectional view showing between the lens drive ring 15 and the lens frame 31. A lens frame 31 holding a photographing lens 30 is urged by a spring 32 to absorb a play. The convex piece 15b elected and bent from the lens drive ring 15 supported on the base plate 10 around the exposure opening is engaged with the lens frame 31, and an outer peripheral portion of the lens frame 31 is engaged with a helicoidal screw 33. Accordingly, when rotating the lens drive ring 15 so as to rotate the lens frame 31, the lens frame 31 moves along the helicoidal screw in a direction of an optical axis.

Figure 7:
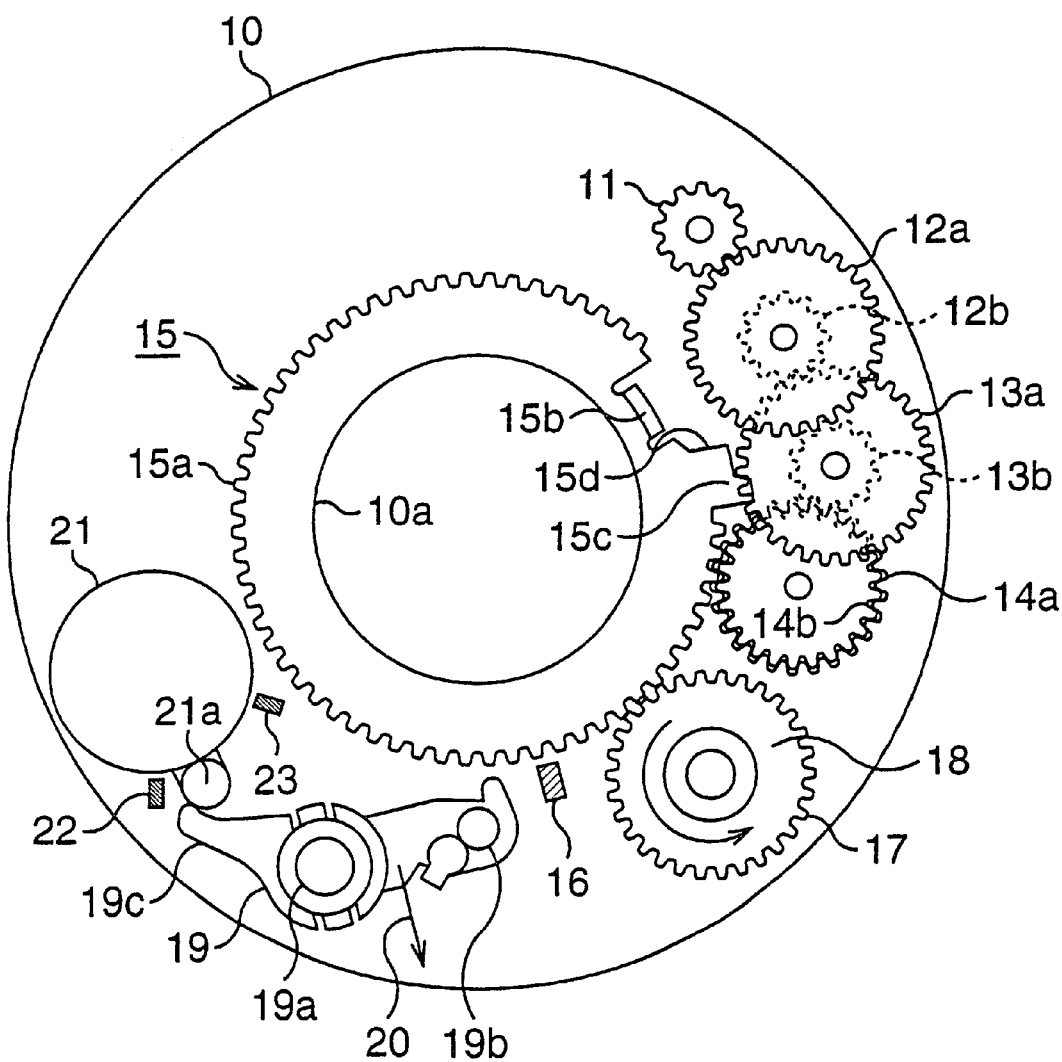
FIG. 7 is a plan view showing an operating state of the operating member shown in FIG. 3.

FIG. 7 shows a state that the lens drive ring 15 shown in FIG. 3 rightward rotates to a target position. In the illustrated embodiment, there is shown a case that the lens drive ring 15 is rightward rotated at a degree of 220 strokes at the maximum from the initial position.

Figure 8:
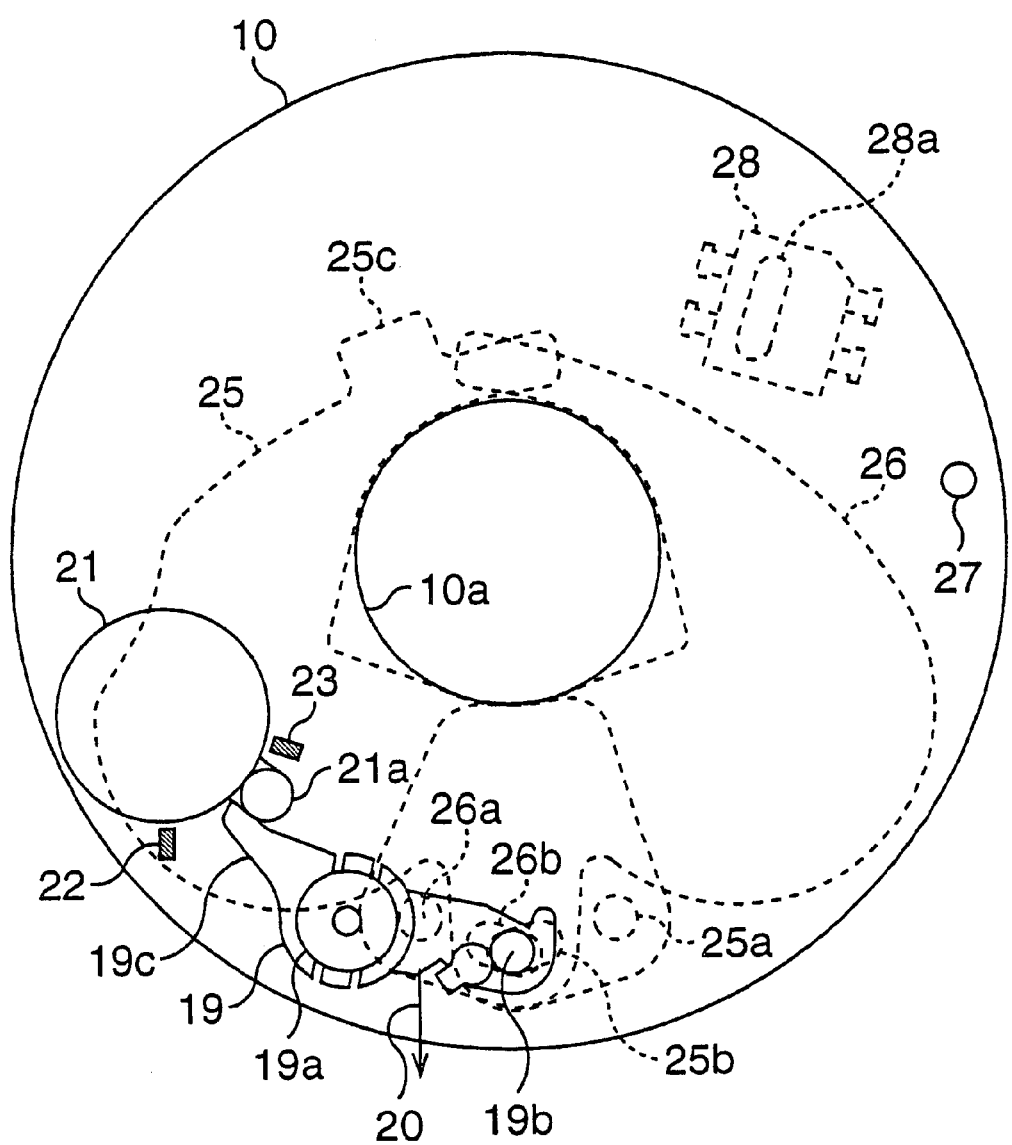
FIG. 8 is a plan view showing an operating state of the shutter blade opening and closing mechanism shown in FIG. 5.

FIG. 8 shows a state that the pair of shutter blades 25 and 26 are moved apart from the lens opening 10a so as to perform an exposing operation. When an energizing operation of the step motor for driving the lens is turned off, the step motor 21 for driving the blade is immediately energized in a normal direction and the output pin 21a is leftward rotated. Accordingly, the blade opening and closing lever 19 is rightward rotated due to the urging force of the spring 20, the shutter blade 25 is leftward rotated around the shaft 25a in an illustrated manner, and the shutter blade 26 is rightward rotated around the shaft 26a so as to open the exposure opening 10a. Further, when the backing piece 25c formed in the shutter blade 25 passes through the sensor hole 28a of the photo reflector 28 during the process that the shutter blade 25 is operated in this manner, the photo reflector 28 generates a detection signal. The detection signal is employed for an automatic exposure control.

Figure 9:
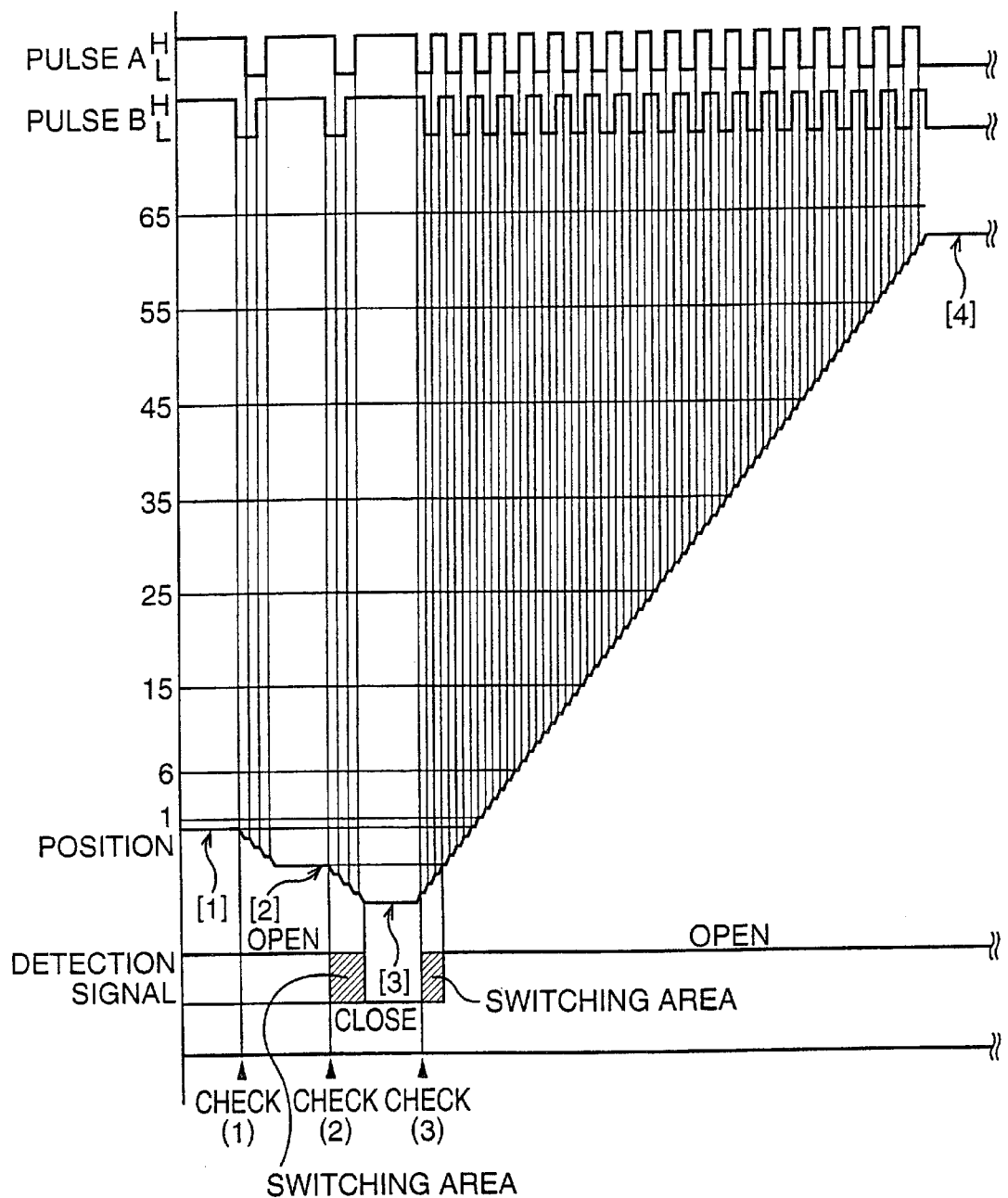
FIG. 9 is a timing chart for explaining an operation of the step motor driving apparatus in accordance with the present invention.

A description will be given in detail of the operation of the step motor driving apparatus in accordance with the present invention with reference to FIG. 9. An illustrated timing chart is expressed by setting an elapsing time to a horizontal axis and a position of the lens operating member in terms of a step number of the step motor to a vertical axis. The timing chart expresses a lens feed-out operation.

As illustrated, the lens operating member is previously placed at an initial position as shown by a symbol [1]. In this case, the initial position [1] is shown in FIG. 3. When reverse rotating the step motor, at first, at a degree of four steps in this state, the operating member 15 rotates in a counterclockwise direction from the initial position [1] shown in FIG. 3, and the convex portion 15c moves close to the projection 19d of the blade opening and closing lever 19 and stops. In this case, since the convex portion 15c is not brought into contact with the projection 19d yet, the blade opening and closing lever 19 is still at the position shown in FIG. 3. Accordingly, since the shutter blade 25 is at a position shown in FIG. 5 and the sensor hole 28a of the photo reflector 28 is not covered with the backing piece 25c, an output of the photo reflector 28 is OPEN. As shown in the timing chart of FIG. 9, a first detection signal check (CHECK (1)) is performed in a state that the operating member 15 is in the initial position [1], and next, a second detection signal check (CHECK (2)) is performed in a state [2] obtained by reverse rotating the step motor 3 at a degree of four steps. As mentioned above, the output of the photo reflector 28 is still OPEN in the state [2].

After confirming that the operating member 15 performs a predetermined normal movement by performing the CHECK (1) and CHECK (2) in this manner, the step motor 3 is further reverse rotated at a degree of four steps and moved to an extreme position [3]. At the extreme position [3], the contact portion 15d of the operating member 15 is brought into contact with the stopper 16. Further, the convex portion 15c of the operating member 15 lifts up the projection 19d of the blade opening and closing lever 19, and slightly rotates the opening and closing lever 19 in a clockwise direction. Accordingly, the backing piece 25c of the shutter blade 25 covers the sensor hole 28a of the photo reflector 28 shown in FIG. 5. Therefore, as shown in the timing chart of FIG. 9, an output of the photo reflector 28 becomes CLOSE. In this state, a third detection signal check (CHECK (3)) is performed. In this series of operating process, the confirmation that the operating member 15 performs the predetermined normal movement is completed. Then, the step motor 3 is forward rotated so as to move the operating member 15 to the target position, whereby the lens feed-out process is finished. In the embodiment shown in FIG. 9, the operating member 15 is fed out, for example, at a degree of 62 steps so as to set to a target position [4].

Figure 10:
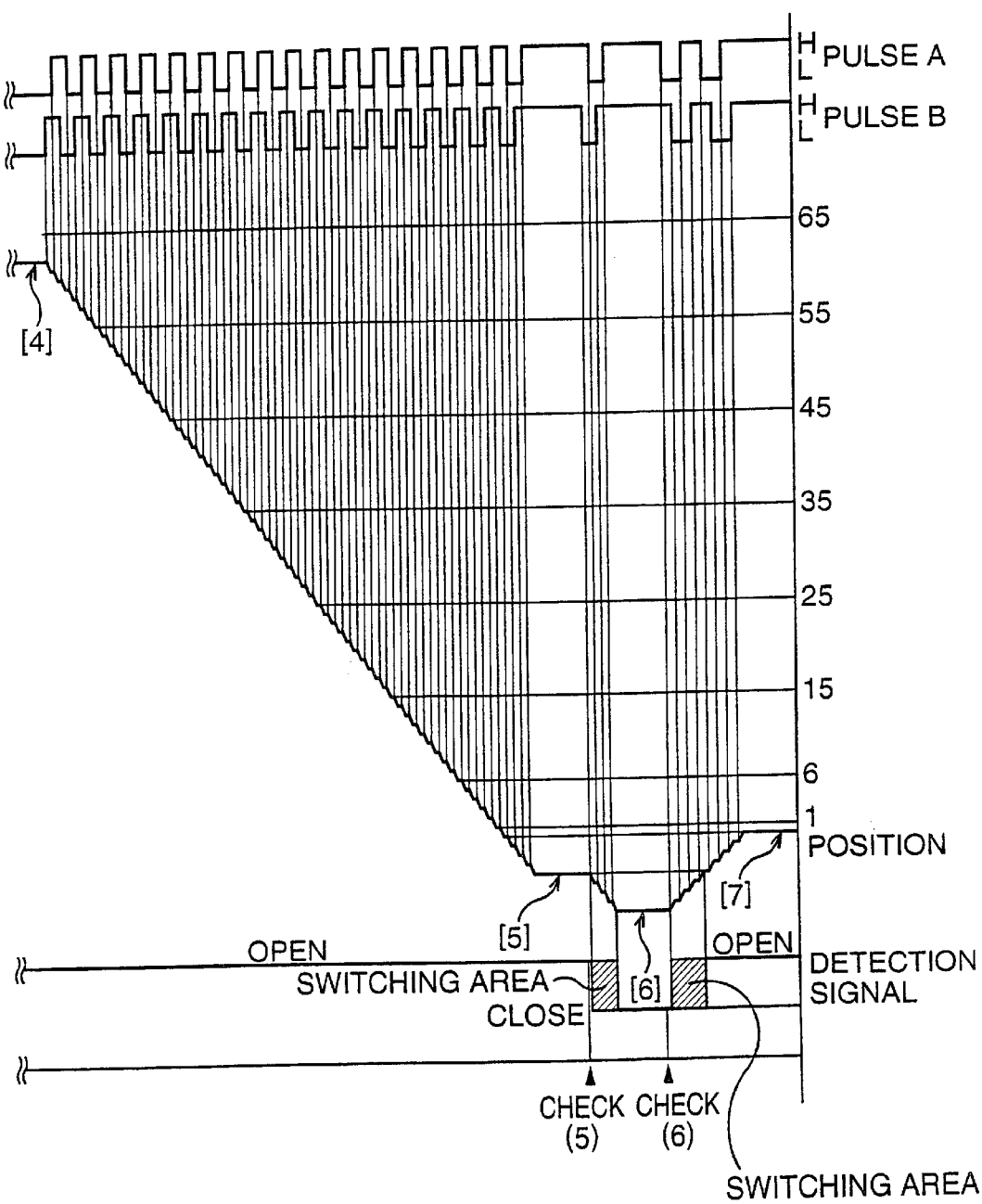
FIG. 10 is a timing chart for explaining a returning operation of the step motor driving apparatus in accordance with the present invention.

FIG. 10 is a timing chart in the case of executing an exposing operation of a camera after the feed-out process of the lens so as to start a lens returning step. As illustrated, the step motor 3 is reverse rotated so as to move the lens operating member 15 to a position [5] corresponding to four steps before the stopper, from the target position [4]. In this case, the position [5] is the same as the position [2] in the feed-out step, and the output of the photo reflector is OPEN. Here, after the detection signal check (CHECK (5)) is executed, the step motor is further four steps reverse rotated so as to move the operating member 15 to an extreme position [6]. The extreme position [6] is the same as the extreme position [3] at a time of feeding out the lens, and the operating member 15 is mechanically brought into contact with the stopper 16. Accordingly, the detection signal is switched to CLOSE. Here, the detection signal check (CHECK (6)) is performed, and a confirmation that the operating member 15 performs the predetermined normal movement is finished. Then, the step motor 8 is forward rotated at a degree of eight steps so as to return the operating member 15 to the initial position [7], and a series of the operation is completed.

As described above, both of the initial position check at a time of feeding out the lens and the initial position check in the returning step are performed in a state where that the step motor is reverse rotated, so that no difference is generated between the feeding out step and the returning step due to the backlash or the like. On the contrary, in the conventional case, since the direction is different between the forward moving time and the returning time, there is generated a problem called a timing lag of the detecting signal with reference to the pulses applied to the step motor, whereby there is a possibility of generating a system error. Further, at a time of checking the detection signal, there is a step of slightly moving the shutter opening and closing lever 19 by the operating member 15. In accordance with the present embodiment, since the operating member 15 engages with the opening and closing lever 19 from the same direction in both of the feed-out step and the returning step, it is possible to design the convex portion 15c of the operating member 15 such that the load according to the operating member 15 becomes least. In the conventional case, since the convex portion 15c shown in FIG. 3 passes through the projection 19d of the opening and closing member 19, and is operated from a right side of the convex portion 15c in the returning step, the difference of the load is generated between the forward moving and the returning. As mentioned above, in accordance with the present invention, it is possible to detect the position from the same direction in both of the forward moving and the returning, and it is possible to cancel the influence of the backlash due to the gear or the like. Further, since the operation of the connection mechanism for connecting the detecting section and the operating member is also performed from one direction, the load applied to the step motor is not changed, and it is possible to stably perform the initial position detection. In this case, the present invention has been exemplified with respect to the lens feed-out operation, however, the present invention can be applied to a shutter apparatus, an aperture apparatus and other driving apparatus employing step motors in addition to the structure mentioned above. Further, in accordance with the present invention, the optical sensor such as the photo reflector or the like is used as the detecting section, however, a mechanical switch or the like may be used for the detecting section.

Figure 11:
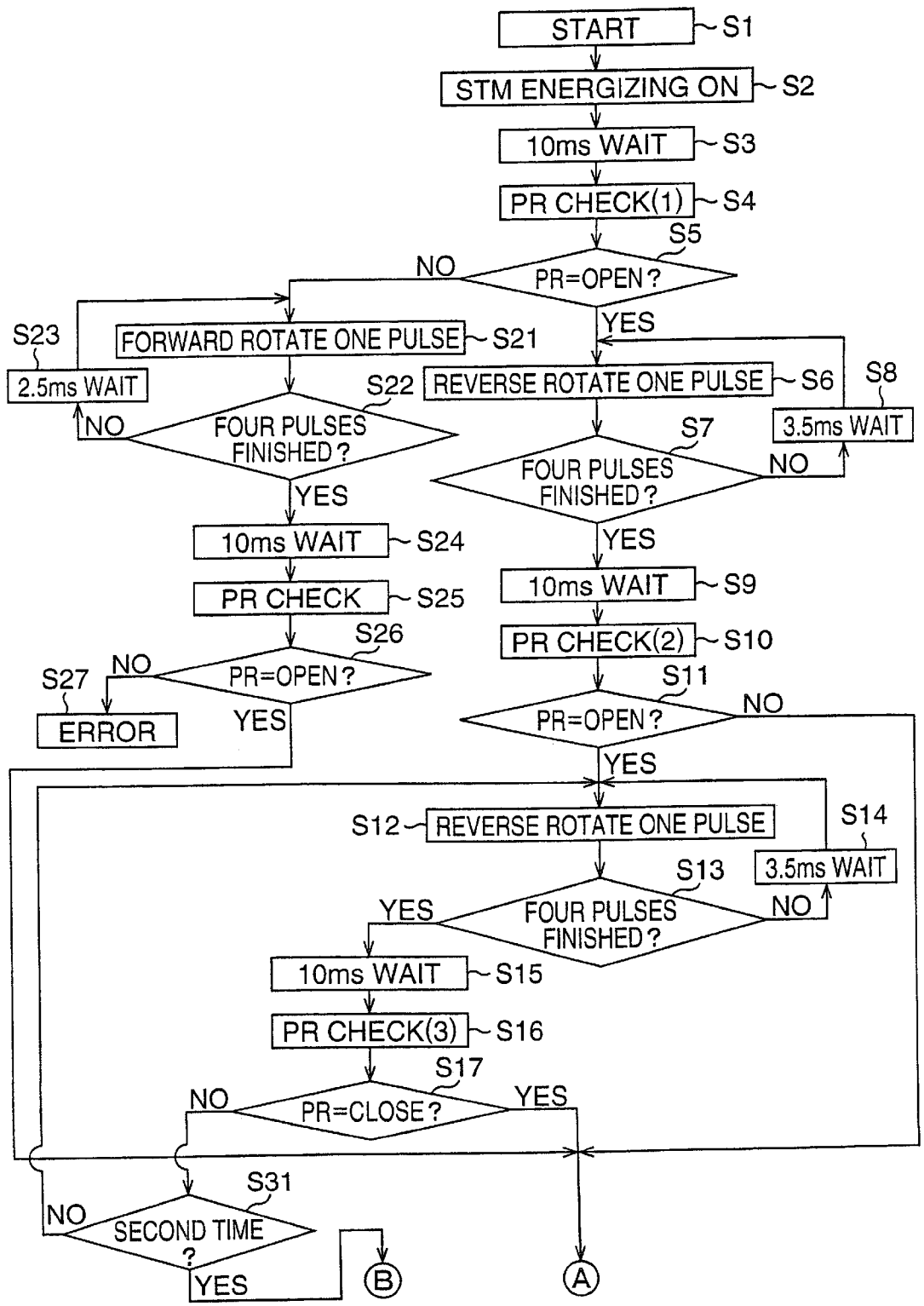
FIG. 11 is a flow chart for explaining an operation of the step motor driving apparatus in accordance with the present invention.

Next, a description will be given for the detail of the operation of the step motor driving apparatus in accordance with the present invention with reference to flow charts and tables shown in FIGS. 11 to 20. FIG. 11 is a flow chart showing a lens feed-out step. At first, the present embodiment is started in a step S1. Then, a step motor (STM) is turned on to be energized in a step S2. After waiting for 10 ms (after maintaining an energizing to the step motor for 10 ms) in a step S3, PR CHECK (1) is performed in a step S4. Subsequently, it is judged in a step S5 whether or not PR=OPEN is established. In the case of YES, the step motor 4 is reverse rotated at a degree of four pulses (four steps) in steps S6, S7 and S8. Then, after waiting for 10 ms in a step S9, PR CHECK (2) is performed in a step S10. It is judged in a step S11 whether or not PR=OPEN is established. In the case that a result of judgement is YES, after further reverse rotating the step motor at a degree of four pulses in steps S12, S13 and S14, the process waits for 10 ms in a step S15. Then, PR CHECK (3) is performed in a step S16. It is judged in a step S17 whether or not PR=CLOSE is established. In the case that a result of judgement is YES, it is confirmed that the operating member correctly performs the predetermined normal movement, and the detection of the initial position is completed.

Since PR=CLOSE is established in the case that a result of judgement is NO in the step S5, it is assumed that the operating member is not at the initial position but at the extreme position. In this case, the step motor is forward rotated at a degree of four pulses in steps S21, S22 and S23, and an additional PR CHECK is performed in a step S25 after waiting for 10 ms in the step S24. It is judged in a step S26 whether or not PR=OPEN is established. In the case that a result of judgement is YES, it is judged that the operation is resumed to be normal, and the step goes to a next step. On the contrary, in the case that the judgement of the step S26 is NO, the step goes to a step S27 and an alarm ERROR is output. That is, it is judged that the operating member cannot escape from the extreme position at which the operating member is caught by the stopper.

Further, since PR=OPEN is established in the case that a result of judgement is NO in the step S17, the operating member does not reach the extreme position. Then, the step goes to a step S31, a retrial is performed only at one time, and the step motor is reverse rotated at a degree of four pulses in the steps S12, S13 and S14. Then, since the operation is returned to be normal when PR CHECK (3) is again performed in the step S16 and it is judged in the step S17 that PR=CLOSE is established, the step goes to next step. On the contrary, in the case that the result of judgement is again NO in the step S17, it is assumed to be abnormal, and the step is branched to another flow in the step S31.

Figure 12:
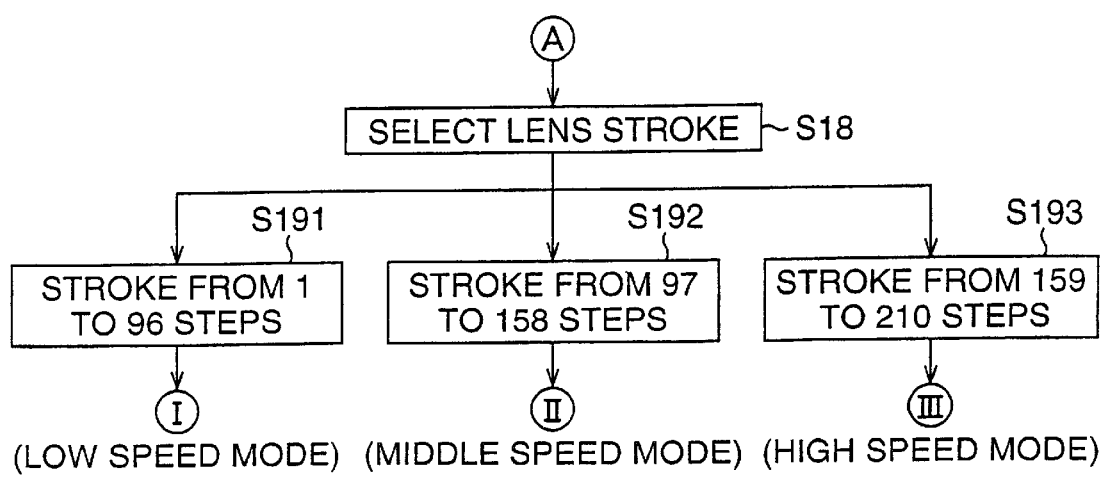
FIG. 12 is a flow chart for explaining an operation of the step motor driving apparatus in accordance with the present invention.

FIG. 12 shows subsequent steps in the case that the result of judgement becomes YES in the step S17. At first, in a step S18, a lens feed-out step (a lens stroke) is set in correspondence to a previously determined object distance. In the case that the stroke corresponds to 1 to 96 steps, the step goes to a step S191 and the lens feed-out is performed in accordance with a low speed mode. Further, in the case that the stroke corresponds to 97 to 158 steps, the step goes to a step S192 and the lens feed-out is executed in accordance with a middle speed mode. Further, when the stroke corresponds to 159 to 210 steps of the step motor, the step goes to a step S193 and the lens feed-out is performed in accordance with a high speed mode.

Figure 13:
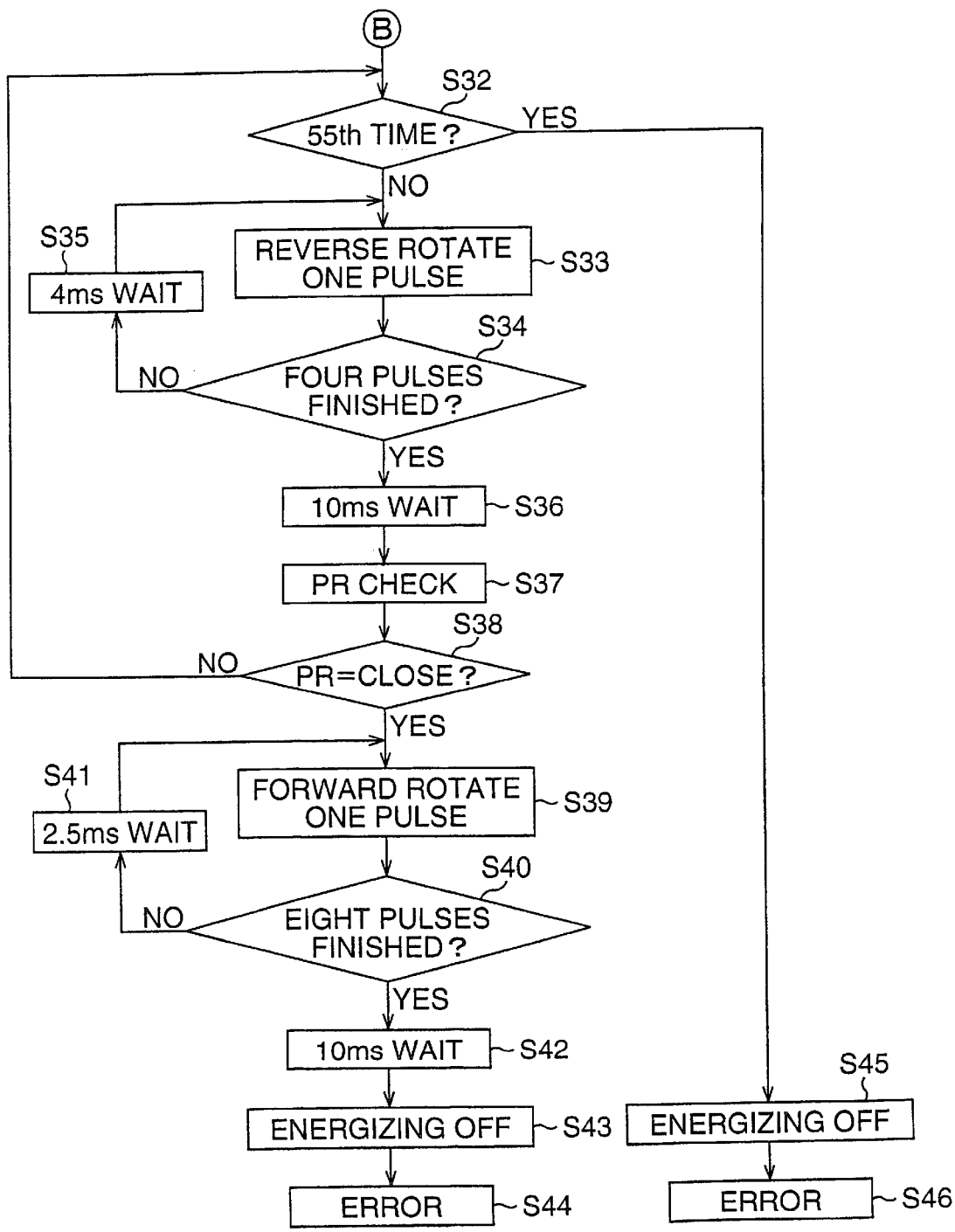
FIG. 13 is a flow chart for explaining an operation of the step motor driving apparatus in accordance with the present invention.

FIG. 13 shows following flows in the case that it is judged in a step S31 in FIG. 11 that the operation is abnormal. At first, it is judged in a step S32 whether the retrial mentioned above reaches 55 times. In this case, when the retrial is repeated at 55 times, the step motor rotates at a degree obtained by the formula 55×4=220 steps. This is a maximum stroke of the operating member. In the case that the operating member cannot return to the extreme position even when reverse rotating the step motor at a degree of the maximum stroke, the step goes to a step S45, an energizing operation is turned off and an ERROR process is performed in a step S46, because the operating member fails to return to the extreme position. On the contrary, when it is judged in the step S32 that the retrial does not reach 55 times yet, the step motor is reverse rotated at a degree of four pulses in steps S33, S34 and S35, then the process waits for 10 ms in the step S36, and thereafter an additional PR CHECK is performed in a step S37. It is judged in a step S38 whether or not PR=CLOSE is established. In the case that the result of judgement is NO, the step goes back to the step S32, and the retrial is repeated until reaching 55 times as mentioned above. On the contrary, in the case that the result of judgement is YES in the step S38, it is judged that the operating member reaches the extreme position as a consequence of some times of trials. In this case, the step motor is forward rotated at a degree of eight pulses in steps S39, S40 and S41 and the operating member is set to the initial position. After waiting for 10 ms in a step S42, an energizing application to the step motor is turned off in a step S43. Then, an error process is performed in a step S44. In this case, the operating member finishes returning to the initial position, however, since there is a possibility that a certain abnormality is generated due to the preceding lens feed-out operation or the like, ERROR message is generated in this case by way of caution.

Figure 14:
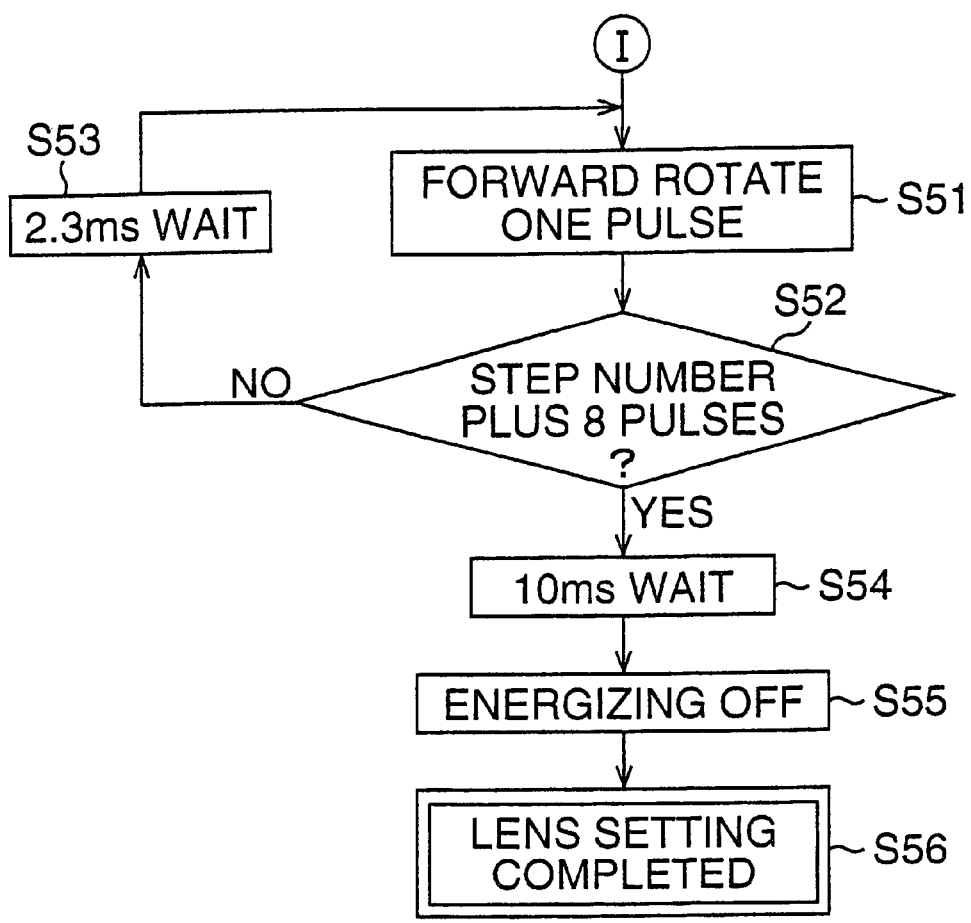
FIG. 14 is a flow chart for explaining an operation of the step motor driving apparatus in accordance with the present invention.

FIG. 14 is a flow chart showing the low speed mode for feeding out the lens. At first, the step motor is forward rotated by one pulse in a step S51 and the number of pulses is counted in a step S52. Then, after waiting for 2.3 ms in a step 53, the step motor is again forward rotated by one pulse in the step S51. In the manner mentioned above, the step motor is successively forward rotated at a pulse interval 2.3 ms so as to feed out the lens at a relatively low speed. When it is judged in the step S52 that the number of the pulses reaches the value (step number+8), the energizing application is turned off in a step S55 after waiting for 10 ms in a step S54, and the lens setting is completed in a step S56. In this case, the value (step number+8) in the step S52 expresses a value obtained by adding the step number for moving the operating member to the target position to the step number 8 for moving the operating member to the initial position from the extreme position prior thereto.

Figure 15:
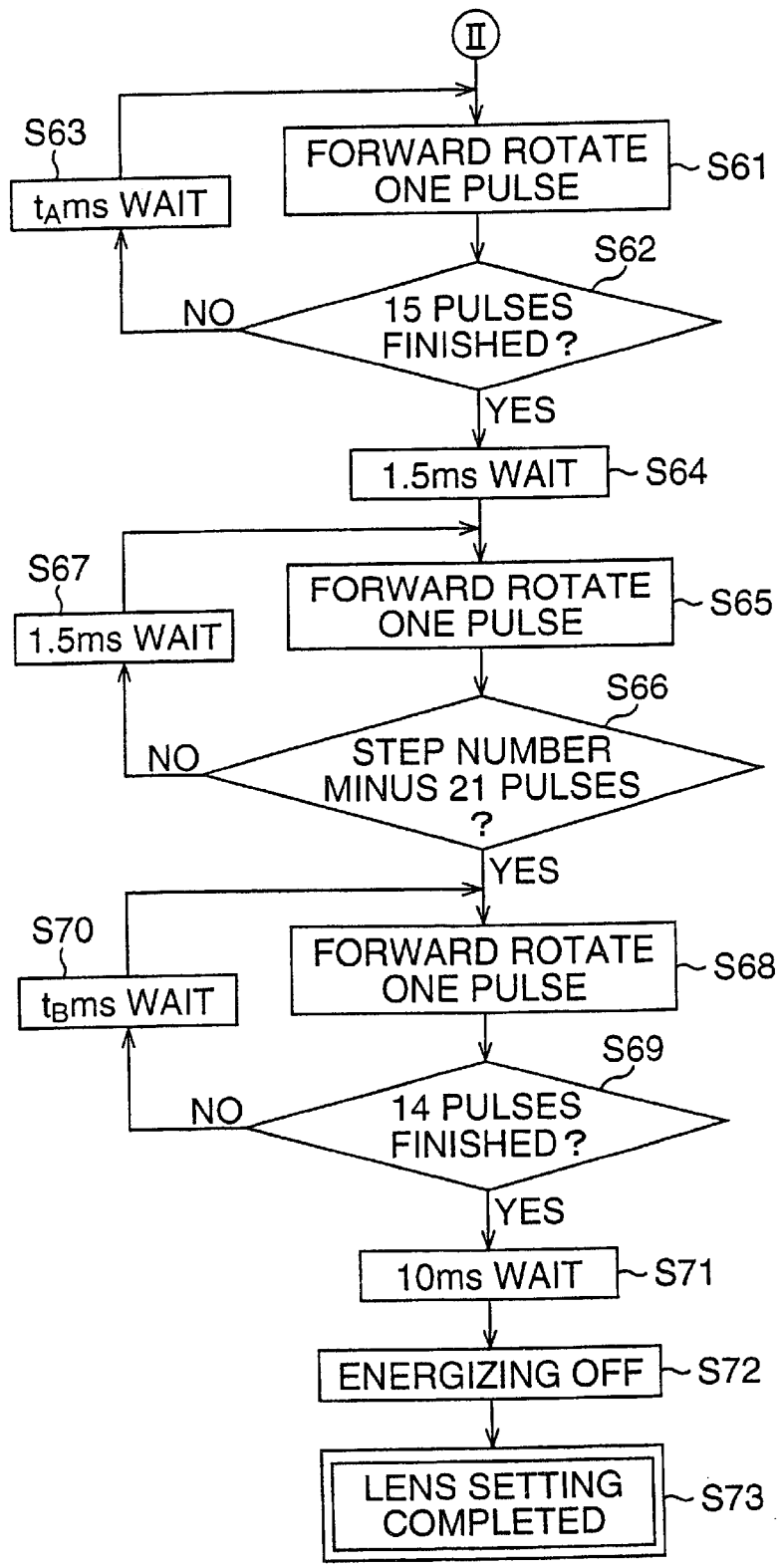
FIG. 15 is a flow chart for explaining an operation of the step motor driving apparatus in accordance with the present invention.

FIG. 15 is a flow chart showing the middle speed mode for feeding out the lens shown in FIG. 12. At first, a pulse interval is set to tA, and the step motor is forward rotated at a degree of 15 pulses in steps S61, S62 and S63. Then, after waiting for 1.5 ms in a step S64, the pulse interval is set to 1.5 ms and the pulse motor is forward rotated at a degree of pulses corresponding to the value (step number−21), in steps S65, S66 and S67. Then, in steps S68, S69 and S70, the pulse interval is set to tB and the step motor is forward rotated at a degree of 14 pulses. In accordance with the steps mentioned above, the operating member reaches the target position. Then, after waiting for 10 ms in a step S71, the energizing application or powering to the step motor is turned off in a step S72, and the lens setting is completed in a step S73.

FIG. 16 is a table expressing particular values of the pulse intervals tA and tB set in the lens feed-out middle speed mode shown in FIG. 15. In this case, the table is previously written on a ROM, and a microprocessor in the control section reads the table data from the ROM so as to perform a rotation control of the step motor.

Figure 17:
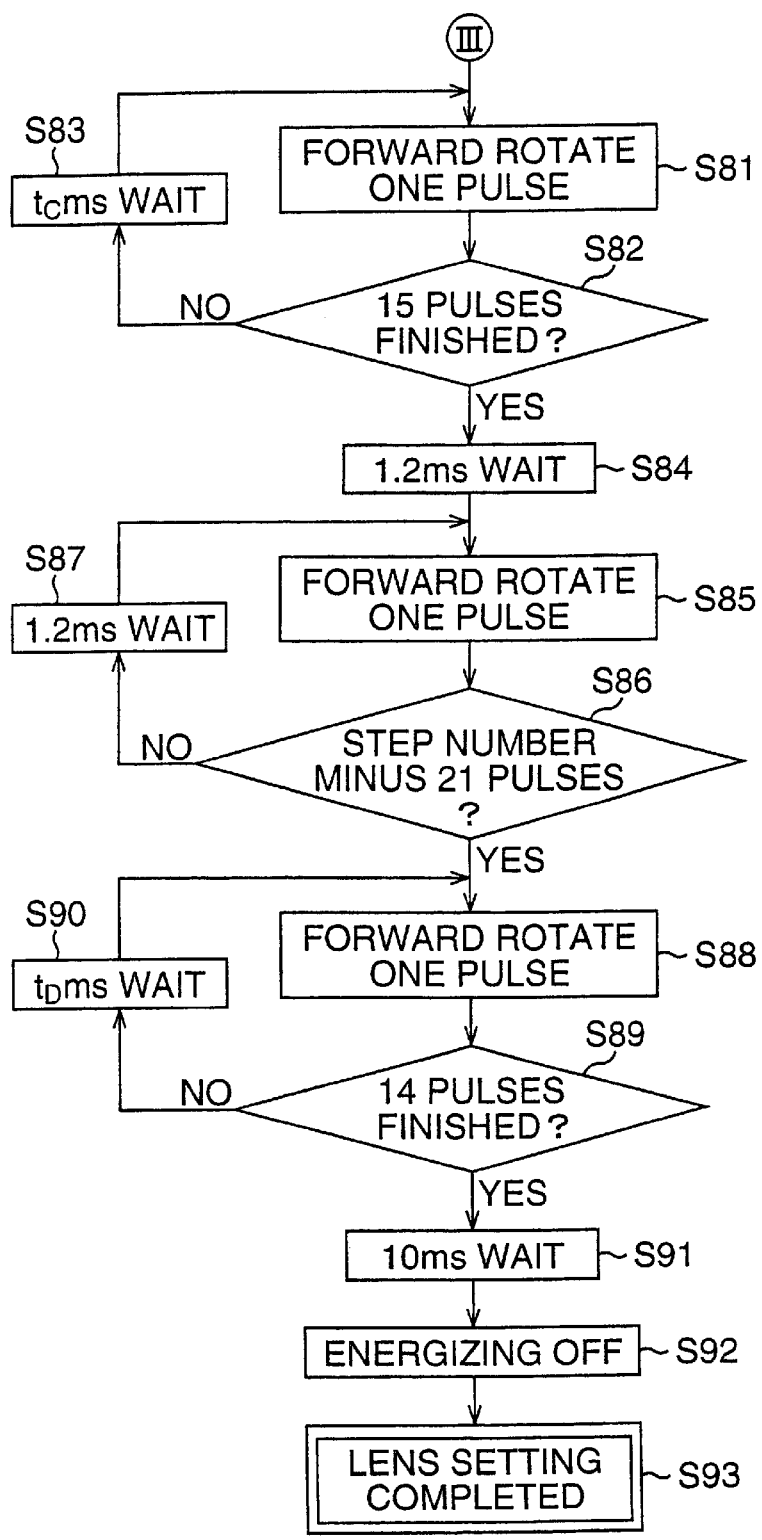
FIG. 17 is a flow chart for explaining an operation of the step motor driving apparatus in accordance with the present invention.

FIG. 17 is a flow chart showing the high speed mode for feeding out the lens shown in FIG. 12. At first, in steps S81, S82 and S83, the pulse interval is set to tC and the step motor is forward rotated at a degree of 15 pulses. Then, after waiting for 1.2 ms in a step S84, the pulse interval is set to 1.2 ms and the step motor is forward rotated at a degree of (step number−21), in steps S85, S86 and S87. Subsequently, in steps S88, S89 and S90, the pulse interval is set to tD and the step motor is forward rotated at a degree of 14 pulses. In accordance with the steps mentioned above, the operating member reaches the target position. Then, after waiting for 10 ms in a step S91, the energizing application is turned off in a step S92, and the lens setting is completed in a step S93.

FIG. 18 is a table expressing values of the pulse intervals tC and tD set in the lens feed-out high speed mode shown in FIG. 17. In the same manner as that of the middle speed mode, these set values are previously written on the ROM.

Figure 19:
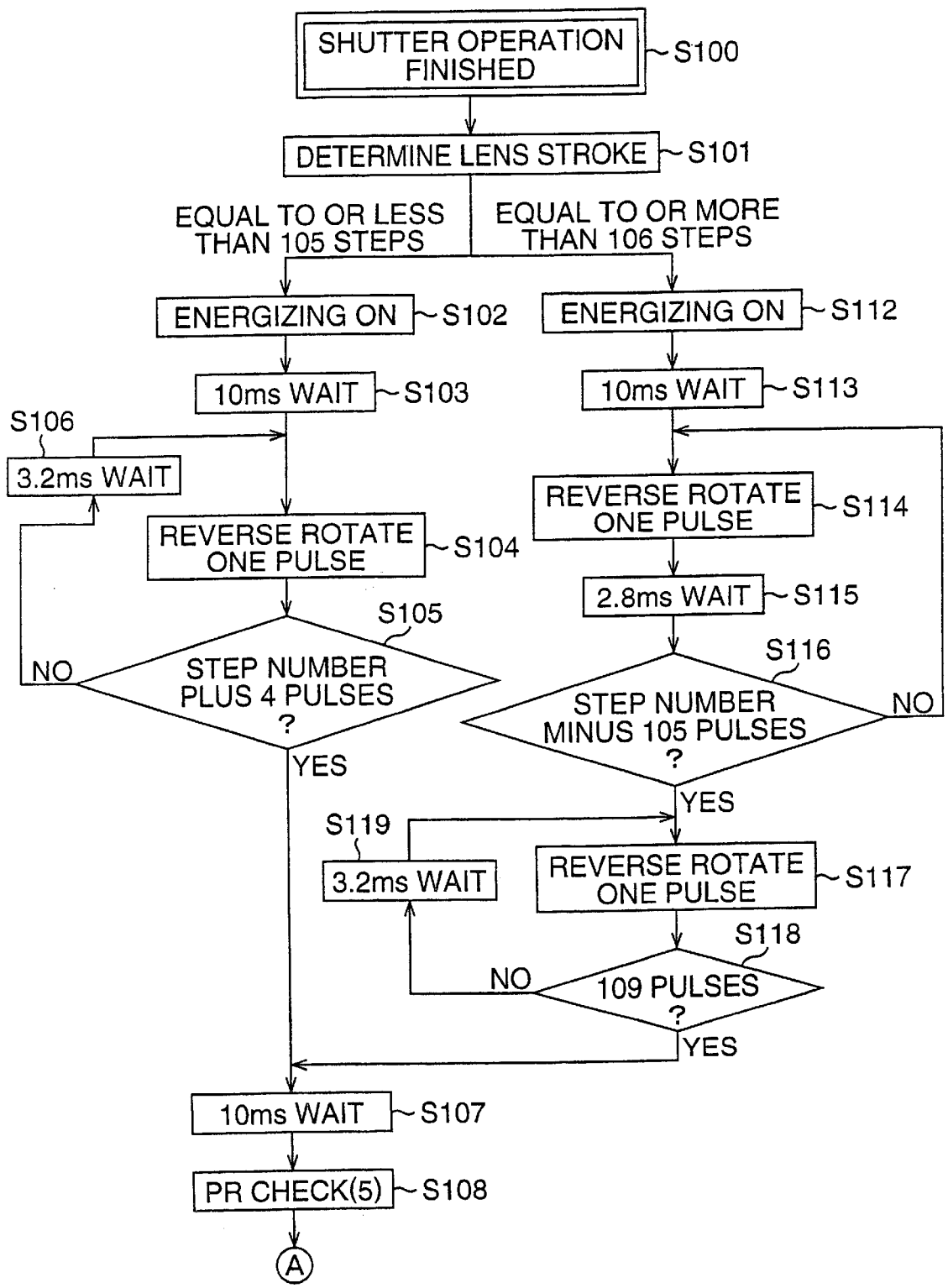
FIG. 19 is a flow chart for explaining an operation of the step motor driving apparatus in accordance with the present invention.

FIG. 19 is a flow chart showing a returning operation of the lens. After the operation of the shutter is finished in a step S100, a lens stroke for returning is determined in a step S101. The stroke at a time of feeding out the lens and the stroke at a time of returning are generally the same. In the case that the lens stroke is equal to or less than a value corresponding to 105 steps, the flow is branched to a left side of the flow chart. In the case that the returning stroke is equal to or more than 106 steps, the flow is branched to a right side. The rotational speed of the step motor is timely controlled in accordance with a value of the stroke required for returning. In the case of being equal to or less than 105 steps, at first, the energizing application to the step motor is turned on in a step S102, the process waits for 10 ms in a step S103, and thereafter the step motor is reverse rotated at a degree of (step number+4) in steps S104, S105 and S106. The pulse interval at this time is 3.2 ms. Accordingly, the operating member stops after passing at a degree of four pulses from the initial position. Then, after waiting for 10 ms in a step S107, PR CHECK (5) is performed in a step S108.

On the contrary, in the case that the lens stroke is equal to or more than 106 steps, the energizing application is turned on in a step S112, and thereafter the process waits for 10 ms in a step S113. Then, the pulse interval is set to 2.8 ms in steps S114, S115 and S116, and the step motor is reverse rotated at a degree of (step number−105). Further, in steps S117, S118 and S119, the pulse interval is set to 3.2 ms, the step motor is reverse rotated at a degree of 109 pulses, and the operating member is returned to a position at which the operating member is moved forward at a degree of four pulses from the initial position. Then, after waiting for 10 ms in a step S107, PR CHECK (5) is performed in a step S108.

Figure 20:
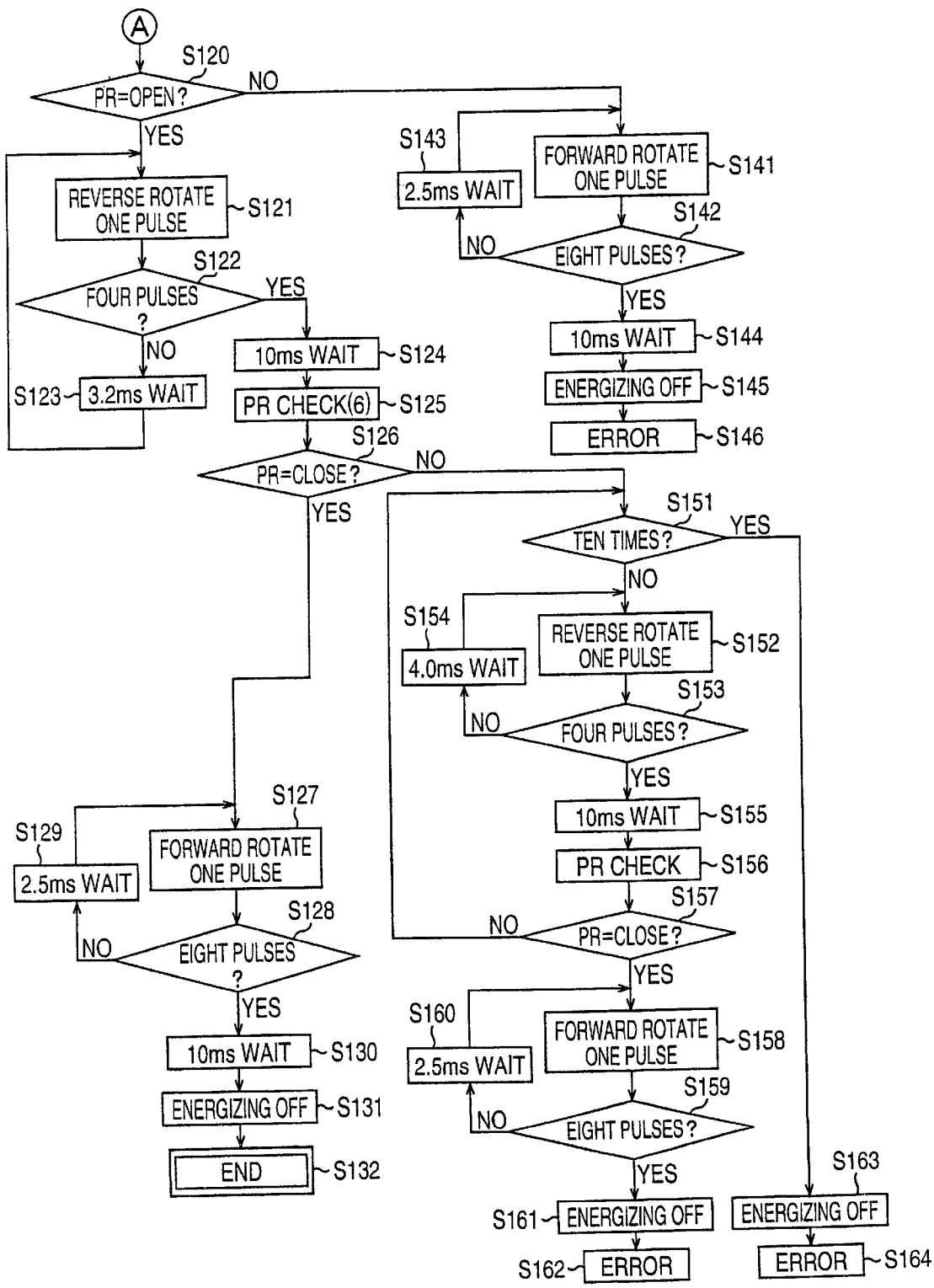
FIG. 20 is a flow chart for explaining an operation of the step motor driving apparatus in accordance with the present invention.

FIG. 20 is subsequent portions of the flow chart shown in FIG. 19. At first, it is judged in a step S120 whether or not PR=OPEN is established. In the case that a result of judgement is YES, it is judged that the operation is normal, and in steps S121, S122 and S123, the pulse interval is set to 3.2 ms and the step motor is reverse rotated at a degree of four pulses. Accordingly, the operating member reaches the extreme position at which the operating member is brought into contact with the stopper. After waiting for 10 ms in a step S124, PR CHECK (6) is executed in a step S125. It is judged in a step S126 whether or not PR=CLOSE is established. In the case that the result of judgement is YES, in the steps S127, S128 and S129, the pulse interval is set to 2.5 ms, the step motor is forward rotated at a degree of eight pulses, and the operating member is set to the initial position. Then, after waiting for 10 ms in a step S130, the energizing application to the motor is turned off in a step S131, and the process is completed in a step S132.

On the contrary, in the case that the result of judgement is NO in the step S120, it is assumed that the operating member is placed at the extreme position. In this case, in steps S141, S142 and S143, the pulse interval is set to 2.5 ms, and the step motor is forward rotated at a degree of eight pulses. After waiting for 10 ms in a step S144, the energizing application to the step motor is turned off in a step S145, and the ERROR process is performed in a step S146. In this case, there is a possibility that the operating member fails to advance at a degree equal to or more than four pulses at a time of feeding out the lens.

In the case that the result of judgement is NO in the step S126, it is assumed that the operating member is not returned to the extreme position. In this case, the pulse interval is set to 4.0 ms in steps S152, S153 and S154 via a step S151, and the step motor is reverse rotated at a degree of four pulses. Further, after waiting for 10 ms in a step S155, an additional PR CHECK is performed in a step S156. It is judged in a step S157 whether or not PR=CLOSE is established. In the case that the result of judgement is NO, the step goes back to the step S151, the correcting process mentioned above is repeated for ten times. As a result, in the case that the result of judgement becomes YES in a step S157, it is assumed that the operating member reaches the extreme position. Then, in steps S158, S159 and S160, the pulse interval is set to 2.5 ms, and the step motor is forward rotated at a degree of eight pulses. Then, the energizing application to the step motor is turned off in a step S161, and the ERROR process is performed in a step S162. In this case, the step motor finishes returning to the initial position.

In the case that the operation does not return to be normal even after performing the correcting process for ten times in the step S151, the step goes to a step S163, the energizing application to the motor is turned off, Then the ERROR process is performed in the step S164. Accordingly, the operating member fails to return for some reasons.

Figure 21:
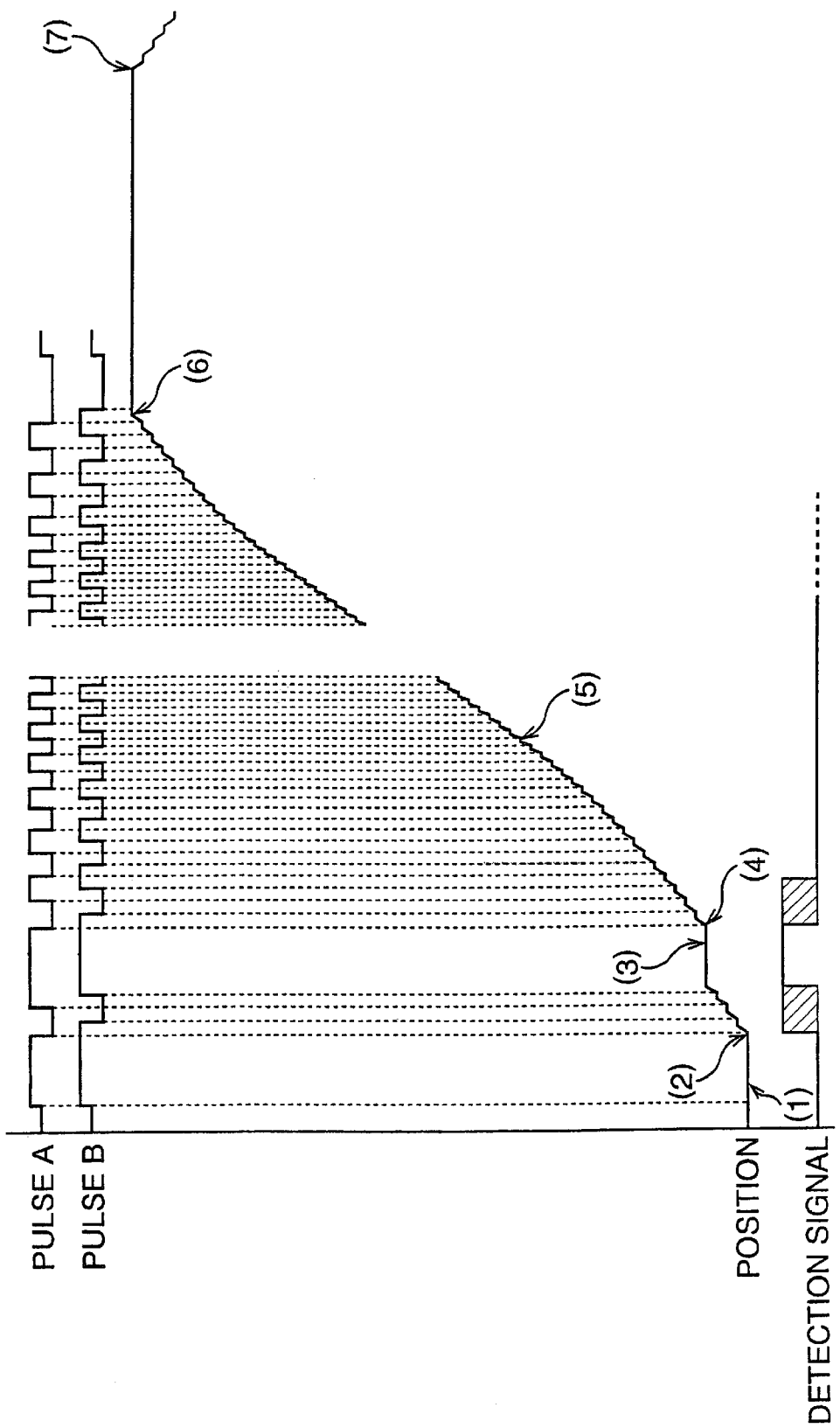
FIG. 21 is a timing chart for explaining an operation of a comparative step motor driving apparatus.

Lastly, a description will be given for a comparative example suffering from a lag of timing in detecting the initial position mentioned above with reference to FIG. 21. In an illustrated timing chart, a horizontal axis expresses a time and a vertical axis expresses a position of a lens operating member. In this timing chart, the position of the lens operating member is expressed in terms of the number of steps of the step motor. The step motor is rotated in response to an application of a pulse A and a pulse B which mutually have different phases. In accordance with of the phases of the pulses A and B, it is possible to selectively control a forward rotation and a reverse rotation of the step motor. Before energizing the step motor, the lens operating member is placed at a mechanically stopped or extreme position in contact with a stopper. At a time of starting the lens operating member in this state, at first, an electric stability is obtained by applying the pulse A and the pulse B having the same phase to the step motor at a timing (1). In this state, the step motor does not rotate yet. Subsequently, a detection signal output from the detecting section is checked at a timing (2). When the step motor driving apparatus is normal, the detection signal becomes a low level (L). Subsequently, the lens operating member is moved to an electrical initial position by controlling the pulse A and the pulse B to forward rotate the step motor at a degree corresponding to four steps. This state is expressed by a timing (3). The detection signal is switched from the low level (L) to a high level (H) in the process where the motor shifts from the timing (2) to the timing (3). The control section judges that the detection signal is switched from the level L to the level H at a timing (4), thereby confirming that the lens operating member performs a predetermined normal movement. Then, the lens operating member is driven to the target position by forward rotating the step motor at a degree corresponding to an object distance at a timing (5). Accordingly, the lens is fed out at a degree corresponding to the object distance, and reaches in a state denoted by a timing (6). As mentioned above, a position control of the lens operating member is an open control on the basis of the number of steps of the step motor, and it is necessary to secure the initial position as a reference for counting the number of steps. After the timing (6), an exposure operation of a camera is performed to reach a state denoted by a timing (7). Then, the lens operating member returns to the extreme position from the target position through the initial position. This returning operation is performed by reverse rotating the step motor in an absolutely reverse direction as opposed to the time of the forward rotation. That is, the step motor is further reverse rotated at four steps after being temporarily stopped at the timing (4) so as to check a detection signal. Further, another detection signal is again checked at the timing (2) and the lens operating member is set to the extreme position after it is confirmed that the detection signal is switched from the level H to the level L.

As mentioned above, in the comparative example, the step motor and the lens operating member are connected to each other by the link member constituted by the gear train, and the backlash exists between the gears of the gear train. Since the backlash of the gear train is different between the forward rotating time and the reverse rotating time of the step motor, there is generated a difference between a timing of the pulses A and B applied to the step motor and an output timing of the detection signal. The output timing of the pulses A and B is controlled by the control section, and the detecting signal is checked in accordance with the same time axis. Accordingly, when a great error is contained in the output timing of the detection signal due to the backlash or the like, the control section cannot perform a correct control, and there is a risk that a system error is caused.

As mentioned above, in accordance with the present invention, it is possible to cancel the lag in the detecting timing due to the backlash or the play of the gear or the like by detecting the initial position at a time of starting the operation, and detecting the initial position at a time of returning after finishing the operation, while performing the detection in the reverse direction of the step motor, whereby it is possible to stably execute the initial position detecting in both of the forward moving and the returning of the operating member.

What is claimed is:

1. A method for operating a driving apparatus including a step motor capable of forward rotating and reverse rotating as a drive source, an operating member connected to the step motor for operation from an initial position to a target position, a link member for connecting the operating member to the step motor, a detecting section for detecting a signal when the operating member comes into a detection zone, and a control section for controlling the operating of the operating member by rotating the step motor, comprising the steps of:

setting the operating member to the initial position from a mechanically stopped position by forward rotating the step motor at a predetermined step number, temporarily reverse rotating the step motor at a time of starting the operation of the operating member from the initial position to move the operating member to the detection zone so that the detecting section may detect the signal when the operating member performs a normal movement, forward rotating the step motor in response to said signal so as to move the operating member to the target position, and conducting a returning operating to the initial position from the target position by reverse rotating the step motor so as to return the operating member from the target position to the detection zone so that the detecting section may detect the signal, and forward rotate the step motor to move the operating member to the initial position.

2. The method as claimed in claim 1, further comprising the step of rotating the step motor so as to forcibly move the operating member to the initial position when the detecting section fails to detect the signal.

3. The method as claimed in claim 2, further comprising the step of generating an alarm indicating that an erroneous operation has occurred when the control section fails to forcibly return the operating member to the initial position.

* * * * *